F. S. WASHBURN.
FERTILIZER MATERIAL AND PROCESS OF PRODUCING THE SAME.
APPLICATION FILED APR. 16, 1915.
1,151,633.  Patented Aug. 31, 1915.
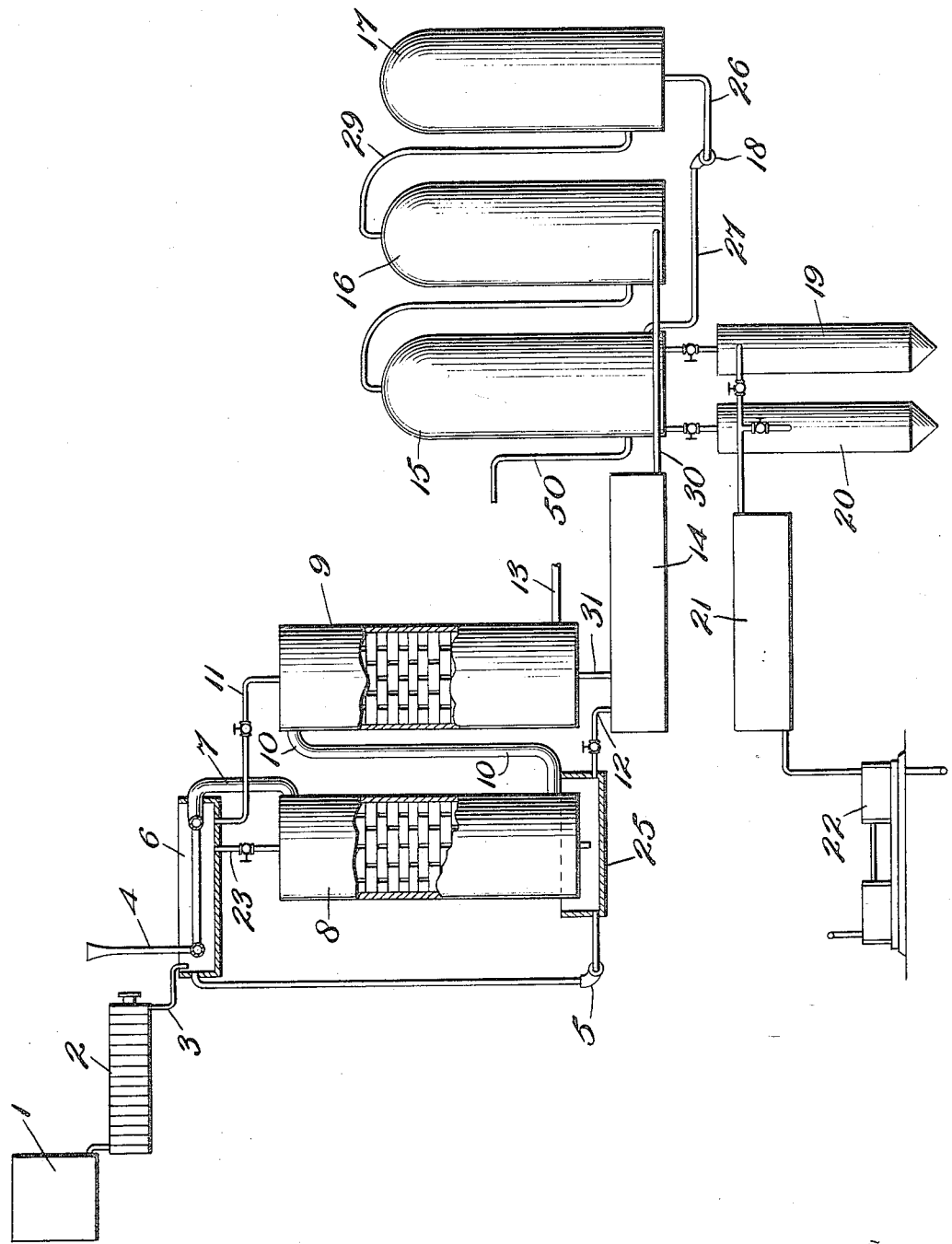

UNITED STATES PATENT OFFICE.

FRANK S. WASHBURN, OF NASHVILLE, TENNESSEE.

FERTILIZER MATERIAL AND PROCESS OF PRODUCING THE SAME.

1,151,633.  Specification of Letters Patent.  Patented Aug. 31, 1915.

Original application filed August 3, 1914, Serial No. 854,858. Divided and this application filed April 16, 1915. Serial No. 21,784.

*To all whom it may concern:*

Be it known that I, FRANK S. WASHBURN, a citizen of the United States, residing at Nashville, in the county of Davidson and State of Tennessee, have invented certain new and useful Improvements in Fertilizer Material and Processes of Producing the Same; and I do hereby declare the following to be a full, clear, and exact description of the invention, such as will enable others skilled in the art to which it appertains to make and use the same.

This invention relates to a process of making a fertilizer containing ammonium phosphate and to the novel product produced by said process, and has for its object to improve the processes and products heretofore proposed.

With these and other objects in view the invention consists in the novel combinations of steps constituting the process and in the novel composition of matter constituting the product all as will be more fully hereinafter disclosed and particularly pointed out in the claims.

This application is a division of my copending application, Serial No. 854,858, filed August 3rd, 1914, and entitled "Process of making mono-ammonium phosphate."

In order that the invention may be more clearly understood reference is had to the accompanying drawing forming a part of this specification in which the figure is a diagrammatic illustration of one form of an apparatus suitable for carrying out the invention and in which—

1 indicates suitable dissolving tanks for treating finely divided phosphate rock with sulfuric acid; 2 a filter press for separating the phosphoric acid solution from the insoluble residue; 3 a discharge pipe from the filter press 2 into the acid heating tank or system 6; and 4 represents any suitable escape pipe for steam from said system.

5 indicates an acid circulating pump connected to the acid heating system 6 as shown, and 11 a pipe for conducting hot acid to the first ammoniating tower 9, while 10 represents a pipe conducting unabsorbed ammonia vapor and gases to a second ammoniating tower 8 connected to the acid heating system 6 by the steam conducting pipe 7.

13 represents an inlet for a mixture of steam and ammonia fed to the first tower 9; and 12 is a pipe connecting the fresh acid tank 25 with the adjusting tank 14 adapted to receive superammoniated acid from tower 9.

15, 16 and 17 represent a triple effect evaporator the elements being connected as shown, and 18 a pump connected to the effect 17 by the pipe 26 and to the effect 15 by the pipe 27 as illustrated.

19 and 20 represent alternate receivers for the fused liquid under a high vacuum, while 21 represents a surface condenser and 22 a vacuum pump connected as shown.

In order that the process may be clearly understood it is said: I start with finely ground phosphate rock in tank 1, and add sufficient sulfuric acid to the same to convert all the tri-calcium phosphate into calcium sulfate and free phosphoric acid, and dissolve the impurities in the rock by adding an additional amount of sulfuric acid. If it is desired to produce this phosphoric acid in a dilute form, the quantity of sulfuric acid to be added need be only sufficient to dissolve the impurities present and convert the tri-calcium phosphate into phosphoric acid, but if it is desired to obtain a phosphoric acid in a concentrated solution, containing say, as much as 25% $P_2O_5$, then one must add a slight excess of sulfuric acid in order to take care of the well known chemical phenomena of mass action, which is found to play an increasingly important part in the reaction as the concentration of phosphoric acid in the solution increases. For instance, if one wishes to obtain a 20% solution of $P_2O_5$ it is necessary to have in this solution a few tenths of a per cent. of free sulfuric acid in order to obtain a high efficiency of extraction, while if one wishes to work to as high as 25% $P_2O_5$ in the extracted phosphoric acid, then this solution should contain nearly 1% of free sulfuric acid to obtain a high extraction of the phosphoric acid from the rock. I next separate this solution of phosphoric acid from the calcium sulfate and other impurities by filtration as by passing it through the filter press 2, and washing it and I thereby obtain a clear solution of crude phosphoric acid containing only a few tenths of a per cent. of such impurities as iron, alumina and soluble lime with a slight amount of free sulfuric acid, as above explained. This said solution is lead from the filter 2 by means of the pipe 3 to the tank or heating system 6. I may ammoniate this crude solution of phosphoric acid in any suitable manner such as by adding aqua ammonia thereto, or by passing ammonia gas into the same. But I prefer to use the ammonia vapor made from commercial calcium cyanamid or lime nitrogen, which contains large quantities of steam at a high temperature. To accomplish this, I fill the towers 8 and 9 with chemical brick, and feed the crude phosphoric acid from the tank into the tower 9 by means of the pipe 11, while the said hot mixture of ammonia and steam as it comes from unabsorbed gases or vapors in the tower 9 are lead from the top thereof to the bottom of tower 8 by means of the pipe 10, while from the top of tower 8 the pipe 7 leads any unabsorbed gases or vapors into the acid heating system or tank 6 to warm up the acid solution before it reaches tower 9. In the first tower 9 fed with ammonia, I so regulate the phosphoric acid that when it leaves at the bottom it is transformed into a mixture of mono-ammonium and di-ammonium phosphates, with as much of the latter as I can possibly obtain; in other words, in this tower I have a fairly large excess of ammonia. Into the second tower 8, which I use merely as a washing tower for clearing up the ammonia escaped from the first tower, I pass through the pipe 23 a large excess of phosphoric acid, so as to be certain to entrap all the last traces of ammonia. In this way I condense no steam in the system, allow no ammonia to escape unabsorbed, and at the same time make an ammonium phosphate solution quite high in di-ammonium phosphate. This ammonium phosphate solution I then run into the adjusting tank 14, through the pipe 31 and then add sufficient phosphoric acid to exactly neutralize it to the mono-ammonium phosphate stage. The process of neutralization of this solution I have found involves some complications inasmuch as methyl-orange, the usual indicator which has always been used for this work does not indicate exact neutrality, but possesses a lag in its indications; so that if one were to operate without corrections, one would not obtain a strictly neutral solution of mono-ammonium phosphate, but would obtain a solution of mono-ammonium phosphate containing about one-fourth of 1% of the phosphoric acid in the di-ammonium form. In the subsequent treatment of the product by this process I have found that di-ammonium phosphate is decomposed into mono-ammonium phosphate, with a consequent loss of ammonia, and, therefore, in order to avoid this loss I find it necessary to correct for this lag of the indicator by adding a corresponding quantity of phosphoric acid.

I am aware of the fact that there are existing patents calling for the neutralization of phosphoric acid by the use of ammonia, either in excess or to alkalinity. But such neutralized solutions, if treated in the manner hereinafter described, I have found always lose ammonia, and I, therefore, find it necessary to work in the manner just described, if one desires to avoid such losses.

Operating in the above manner one obtains a solution of crude mono-ammonium phosphate containing sulfates as well as impurities such as iron and alumina. This solution contains as its soluble constituents mono-ammonium phosphate, and ammonium sulfate, as well as a water insoluble precipitate which contains the impurities above referred to. For instance, a typical analysis of this insoluble precipitate will show it to contain:

| | |
|---|---|
| $NH_3$ | 7.0 % |
| $P_2O_5$ | 40.5 % |
| $Fe_2O_3$ | 12.5 % |
| $Al_2O_3$ | 21.5 % |
| $CaO$ | 1.0 % |
| $SO_4$ | 0.25% |
| $SiO_2$ | 0.1 % |
| Moisture and undetermined | 17.15% |

The quantity of this precipitate varies with the quality of the rock used and with the excess of sulfuric acid required to insure complete extraction of the phosphoric acid content. But the above analysis represents a typical case where Tennessee rock has been used, and the phosphoric acid extracted contained about 1% free sulfuric acid. By following a suitable method of precipitation the phosphoric acid in this precipitate will be found to be practically all citrate soluble; but as the precipitate itself contains only a small fraction of the total phosphoric acid, there is actually not very much citrate soluble phosphoric acid in it.

I have discovered that a solution of mono-ammonium phosphate containing such a precipitate as the above, possesses peculiar properties when one concentrates it. That is to say, this said solution of crude ammonium phosphate still contains said insoluble precipitate at its normal boiling point of about 102° C.; as water is evaporated the boiling point rises very slowly with increase of the concentrates until it reaches say 105° C., when something over ¾ of the water has been evaporated. If heating is now continued the boiling point rises very rapidly with increasing concentration until a temperature of approximately 112–115° C. is reached, at which temperature the boiling point no longer changes. These results may be explained as follows:—Below 105° water is lost by ordinary evaporation leaving behind the solid constituents of the solution; but from 105° up to 115° there is possibly a fusion of the solid constitutents in combination with the water, therefore further heating drives off water from this mixture of water and fused salt, and at 112° C. a material containing about 10% water is had, which again separates out from the fusion as a solid, and the water is again evaporated.

If evaporation is continued after the temperature of 112° C. is reached the material will set solidly in the evaporator and this solid mass cannot be removed except by laborious means. On the other hand, if when this temperature is reached the mass is suddenly expelled from the evaporator into a high vacuum chamber it puffs up into a granular form and loses in water some 5% to 7% of its weight, due to the sensible heat in the mass when tapped into the vacuum chamber, causing the water to be expelled as steam. It therefore can be removed from said chamber as a nearly dry granular mass, somewhat resembling "puffed wheat." In other words by subjecting the said mass to the action of a vacuum, I am enabled to remove directly from an evaporator a valuable fertilizer material containing only say 3% to 4% of moisture, and thus avoid the great delay and expense heretofore found necessary in drying the contents of such evaporators. Not only is this saving in time and expense accomplished, but the puffed up or finely divided granular material is in such a condition on leaving the vacuum chamber that further handling in the ordinary direct fired, or similar type of driers, is rendered very easy if it is desired to remove more of the moisture. When such is the case the granular mass is accordingly subjected to the action of any suitable drier.

In carrying out this process of evaporation I may move the solution by any suitable means, as for example by pumping it from tank 14 through the pipe 30, into the second effect 16 of a multiple effect evaporator, from which it passes through the pipe 29 to the 3rd effect 17 of this evaporator and so on to the last effect if more than three effects are used. I then take it through the pipe 26, pump 18 and pipe 27 into the first effect of the evaporator which is supplied with steam through a pipe 50 at such pressure that the temperature in the first effect 15 will be substantially 112° C. or above. In the first effect 15, I continue the evaporation of the solution until the temperature of 112° C. is reached in the mass itself, at which time it contains about 10% of moisture and is ready to be tapped into the vacuum receivers 19 and 20 for the removal of additional moisture, by the above described puffing up action.

It will now be clear that by this system of operation I avoid the very great difficulty heretofore experienced in drying a highly concentrated and wet solution of ammonium phosphate, such as would be obtained if ordinary evaporators were used. In fact a product obtained from such ordinary evaporators would be so wet and adhere so strongly to iron that it would be impossible to dry it through any of the ordinary direct fired types of driers within the limits of reasonable costs. The puffed up product obtained through the use of a vacuum on the other hand, is porous, dry to the touch, somewhat resembling pumice stone when in larger lumps, and consisting of gray, cream colored porous grains, or granules, when more finely divided, so that it can be further handled with the greatest ease.

It is obvious that those skilled in the art may vary the details of the process without departing from the spirit of the invention. I therefore do not wish to be limited to the above disclosure except as may be required by the claims.

What I claim is:—

1. The process of substantially drying a solution of a fertilizer material containing mono-ammonium phosphate which consists in heating said solution to substantially 112° C. to drive off a predetermined portion of its water; and then subjecting the same to the action of a vacuum sufficiently high to render said material when released substantially firm to the touch, substantially as described.

2. The process of reducing a solution of mono-ammonium phosphate to a dry, granular, form which consists in driving off a portion of its water by heating the same to substantially 112° C.; subjecting the mass to the action of a vacuum sufficient to cause it to lose another portion of its water, and to assume a granular form; and finally subjecting the granular mass to the action of a suitable drier, substantially as described.

3. The herein described new fertilizer product containing mono-ammonium phosphate in the form of a porous, granular, mass, substantially dry to the touch, and physically somewhat resembling pumice stone when in the form of lumps, substantially as described.

In testimony whereof I affix my signature, in presence of two witnesses.

FRANK S. WASHBURN.

Witnesses:
G. M. SCHURMAN,
THOS. M. APPLEGARTH.